United States Patent Office 3,591,614
Patented July 6, 1971

3,591,614
SUBSTITUTED ETHYL DERIVATIVES OF TRICYCLOHEXYLTIN
Donald E. Bublitz, Concord, Calif., assignor to The Dow Chemical Company, Midland, Mich.
No Drawing. Filed Sept. 20, 1968, Ser. No. 761,310
Int. Cl. A01n 9/20, 9/24; C07f 7/22
U.S. Cl. 260—429.7       4 Claims

ABSTRACT OF THE DISCLOSURE

Substituted ethyl derivatives of tricyclohexyltin, wherein the substituted ethyl group is selected from 2-carboxyethyl, 2-cyanoethyl or 2-carb(lower)alkoxyethyl, said derivative being useful as pesticides.

---

The present invention relates to novel and useful substituted ethyl derivatives of tricyclohexyltin wherein the substituted ethyl group is 2-cyanoethyl, 2-carboxyethyl, and 2-carb(lower)alkoxyethyl. These compounds are representable by the following Formula I:

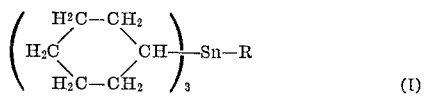

(I)

In this and succeeding formulas, R is 2-cyanoethyl, 2-carboxyethyl, or 2-carb(lower)alkoxyethyl.

In the present specification and claims, the term "(lower)alkoxy" denotes the presence of an alkoxy group containing from 1, to 2, to 3, to 4 carbon atoms and 1 and 2 and 3 and 4 carbon atoms, that is methoxy, ethoxy, n-propoxy, isopropoxy, n-butoxy, sec-butoxy, isobutoxy, and t-butoxy.

The compounds of the present invention are crystalline solids or oils at room temperature. They are useful as pesticides for the control of a wide variety of pests such as arachnid, fungal, plant, and insect organisms, for example, mites, ticks, the causative agents of apple scab and potato late blight, pigweeds, bindweed, worms, flies, beetles, and roaches. They are particularly useful as acaricides for the control of mites and ticks.

The compound of the present invention wherein R is 2-cyanoethyl and 2-carb(lower)ethoxyethyl are prepared by reacting together tricyclohexyltin hydride and acrylonitrile (propenitrile) or (lower)alkyl acrylate (propenoate). The reaction proceeds smoothly at temperatures of from about room temperature to about 150° C. The reaction can be conducted in inert anhydrous organic liquid reaction medium such as is provided by common organic solvents or mixtures thereon including ether, tetrahydrofuran, hexane, benzene and the like. The amounts of the reactants employed are not critical, some of any of the desired products being formed when employing any proportions of reagents. However, the reaction consumes the reagents in the proportion of one mole of tricyclohexyltin hydride per mole of acrylonitrile or (lower)alkyl acrylate compound and the employment of such proportions is usually preferred.

In conducting the reaction, the tricyclohexyltin hydride and acrylonitrile or (lower)alkyl acrylate compound, and liquid reaction medium, if employed, are contacted with one another in any convenient order or fashion. In a preferred manner, the tricyclohexyltin hydride is mixed with the acrylonitrile or (lower)alkyl acrylate. The reaction mixture is then maintained within the given temperature range for a period of time sufficient to complete the reaction. The reaction mixture is conventionally processed to separate and isolate product. Such processing includes evaporation, filtration, extraction, distillation, chromatography, and the like.

The 2-carboxyethyltricyclohexyltin compound is prepared from the corresponding 2-carb(lower)alkoxyethyltricyclohexyltin ester compounds upon hydrolysis with alcoholic potassium hydroxide solution in the manner known per se. In such operations, an ester is contacted with at least an equimolecular proportion and, preferably, an excess of potassium hydroxide which is dispersed in a lower alkanol such as methanol and ethanol. The resultant mixture is maintained at a temperature sufficient to produce hydrolysis and conveniently at the boiling temperature and under reflux for a period of time sufficient to complete the reaction. The resulting acid product is conventionally separated and recovered from the reaction mixture. Conveniently, the reaction mixture is diluted with water and the resultant mixture is acidified such as with a mineral acid, for example, hydrogen chloride to provide the 2-carboxyethyltricyclohexyltin product as a separate phase. The product is conveniently recovered by means of filtration or decantation and further purified, if desired, through recrystallization or washing.

The following examples illustrate the present invention but are not to be construed as limiting.

EXAMPLE 1

2-cyanoethyltricyclohexyltin

Tricyclohexyltin hydride (7.4 grams; 0.020 mole) and acrylonitrile (1.1 grams; 0.021 mole) are mixed together at room temperature with stirring. The resulting mixture is heated to 100° C. and thus maintained for 10 hours. At the end of this time, the reaction mixture is evaporated under a reduced pressure with gradually decreasing pressures down to about 0.2 millimeter Hg over a period of one hour in order to remove volatile materials and obtain the desired 2-cyano-2-ethyltricyclohexyltin product as a residual solid which melts at from 54° to 57° C. The infrared spectrum and nuclear magnetic resonance data support the assigned structure.

EXAMPLE 2

2-carbomethoxyethyltricyclohexyltin 2-carbomethoxyethyltricyclohexyltin, which has a molecular weight of 455.2, is prepared in accordance with the procedure of Example 1 by reacting together substantially equimolecular amounts of metyl acrylate and tricyclohexyltin hydride.

EXAMPLE 3

2-carboxyethyltricyclohexyltin

A methanolic potassium hydroxide solution is prepared by dispersing, portionwise, 1.12 grams (0.0200 mole) of potassium hydroxide in 100 milliliters of methanol at room temperature. 2-carbomethoxyethyltricyclohexyltin (4.55 grams; 0.0100 mole) is then added to the resultant solution. This addition is conducted with stirring at room temperature and over a period of 5 minutes. The resultant reaction mixture is heated to the boiling point and maintained at reflux for 10 hours with continual stirring to insure completion of the reactton. Following the heating period, the reaction mixture is cooled and diluted with 200 milliliters of water. The cooled and diluted mixture is acidified with aqueous hydrogen chloride. During the acidification, a product precipitates in the reaction mixture as a solid. This solid is collected by filtration and washed with water to obtain the desired 2-carboxyethyltricyclohexyltin product as a white crystalline material melting at from 153° to 156° C. The product is identified from its infrared spectrum and nuclear magnetic resonance data.

EXAMPLE 4

2-carboethoxyethyltricyclohexyltin

In a manner analogous to that set forth in Example 1, ethyl acrylate and tricyclohexyltin are reacted together to obtain 2-carboethoxyethyltricyclohexyltin as a colorless oil boiling at from 165–170° C. at 0.03 millimeter pressure, and having a refractive index $n_D^{25}$ 1.5237. The infrared spectrum and nuclear magnetic resonance data support the assigned structure.

In accordance with the foregoing procedures, other compounds of the present invention are prepared as follows:

2 - carbisopropoxyethyltricyclohexyltin (molecular weight 469.3) by reacting together isopropyl acrylate and tricyclohexyltin hydride.

2 - carb(n - butoxy)ethyltricyclohexyltin (molecular weight 483.3) by reacting together n-butyl acrylate and tricyclohexyltin hydride.

Carbisobutoxyethyltricyclohexyltin (molecular weight 483.3) by reacting together isobutyl acrylate and tricyclohexyltin hydride.

The compounds of the present invention are useful as pesticides for the control of a wide variety of household and agricultural pests such as arachnid, fungal, plant and insect organisms, as for example, mites, ticks, *Bacillus subtilis*, bread mold fungus, pigweeds, roaches, *Daphnia*, worms, and flies. For such use, the unmodified compounds can be employed. Alternatively, the compounds can be dispersed on an inert finely divided solid to prepare dust compositions. The latter dust compositions can be dispersed in water with or without the aid of a wetting agent and the resulting aqueous dispersions employed as sprays. In other procedures, the compounds can be employed as a constituent in edible oils or in other oils or solvents, or as a constituent in solvent-in-water or water-in-solvent emulsions or dispersions which can be employed as sprays, drenches or washes. Good results are obtained with methods employing and compositions containing pesticidal amounts of one or more of the compounds hereof. Generally, these amounts range from about 0.5 to about 5000 parts per million of one or more of the compounds.

In representative operations, each of 2-cyanoethyltricyclohexyltin, 2-carboxyethyltricyclohexyltin, and 2-carbethoxyethyltricyclohexyltin gives complete controls and kills of two-spotted spider mites when the latter are separately contacted with compositions containing, as the sole toxicant, one of the named compounds at a concentration of 500 parts per million by weight.

The tricyclohexyltin hydride employed as a starting material as herein described can be prepared by reducing tricyclohexyltin chloride with lithium aluminum hydride, preferably in organic reaction medium and at temperatures of from about minus 10° to about 110° C.

What is claimed is:

1. The compound corresponding to the formula

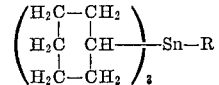

wherein R represents 2-cyanoethyl, 2-carboxyethyl, or 2-carb(lower)alkoxyethyl.

2. The compound claimed in claim 1 wherein R is 2-cyanoethyl or 2-carboxyethyl.

3. The compound claimed in claim 1 wherein R is 2-cyanoethyl or 2-carbethoxyethyl.

4. The compound claimed in claim 1 wherein R is 2-carboxyethyl or 2-carbethoxyethyl.

References Cited

UNITED STATES PATENTS 3,188,331    6/1965    Weissenberger ____ 260—429.7X

OTHER REFERENCES

Van Der Kerk et al.: Journal of Applied Chemistry, vol 7 (1959), pp. 356–359.

JAMES E. POER, Primary Examiner

W. F. W. BELLAMY, Assistant Examiner

U.S. Cl. X.R.

424—288